(12) United States Patent  (10) Patent No.: US 6,301,826 B1
Thorpe  (45) Date of Patent: Oct. 16, 2001

(54) FISHING LURE STORAGE SYSTEM

(76) Inventor: Allen S. Thorpe, 440 N. Cottonwood View, P.O. Box 544, Orangeville, UT (US) 84537

( * ) Notice: Subject to any disclaimer, the term of this patent is extended or adjusted under 35 U.S.C. 154(b) by 0 days.

(21) Appl. No.: 09/476,560

(22) Filed: Jan. 3, 2000

(51) Int. Cl.⁷ .................................................. A01K 97/06
(52) U.S. Cl. .............................................................. 43/57.1
(58) Field of Search ....................... 43/57.2, 54.1, 43/206, 57.1; 206/315.11; 224/920

(56) References Cited

U.S. PATENT DOCUMENTS

| | | | |
|---|---|---|---|
| 578,458 | * | 3/1897 | Knieriemen ........................ 43/57.1 |
| 2,558,124 | * | 6/1951 | Burden ............................... 43/57.2 |
| 3,769,741 | | 11/1973 | Hessler et al. . |
| 4,516,707 | | 5/1985 | Crapanzano . |
| 4,631,856 | | 12/1986 | Born . |
| 4,681,220 | | 7/1987 | Beneke . |
| 4,691,471 | * | 9/1987 | Hansen .............................. 43/57.2 |
| 4,708,581 | * | 11/1987 | Whittier ............................ 43/57.1 |
| 4,890,414 | * | 1/1990 | Bridenthal et al. ................ 43/57.1 |
| 4,892,241 | | 1/1990 | Mavrakis . |
| 4,927,016 | | 5/1990 | Fuller . |
| 4,970,821 | | 11/1990 | Young . |
| 5,386,662 | * | 2/1995 | Vader et al. ....................... 43/57.2 |
| 5,454,185 | | 10/1995 | Love . |
| 5,555,671 | | 9/1996 | Voight et al. . |
| 5,606,820 | | 3/1997 | Suddeth . |
| 5,829,185 | | 11/1998 | Myers . |

* cited by examiner

*Primary Examiner*—Thomas Price
(74) *Attorney, Agent, or Firm*—Thorpe, North & Western

(57) ABSTRACT

A fishing lure storage system comprising a substantially planar body of material preferably formed into a closeable booklet form, having a plurality of elongate slides disposed in slide channels formed in the inside of the body. Each slide has near its top portion a lure hook protruding away from the inside of the body, and a spring which biases the slide toward the top of the body. Toward the bottom of the inside of the booklet are one or more transverse hook channels having a top edge for hooking fish hooks, and a cavity for protecting the barb of the hook. One end of a fishing lure is disposed over one of the lure hooks, while a fish hook disposed on the other end of the lure is hooked on the top edge of one of the hook channels, causing the lure to be held in place by the biasing force of the spring.

21 Claims, 3 Drawing Sheets

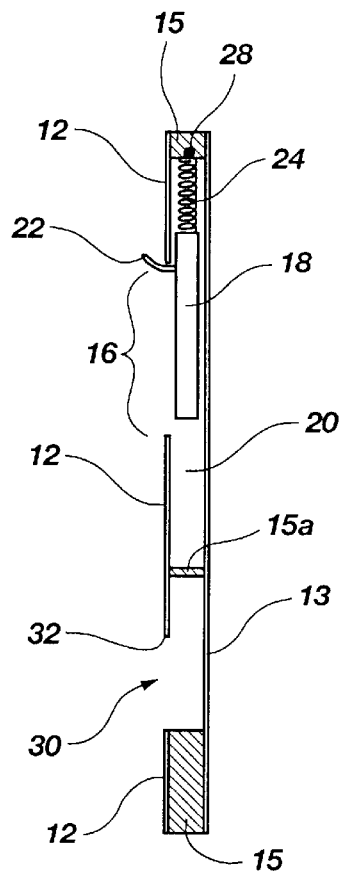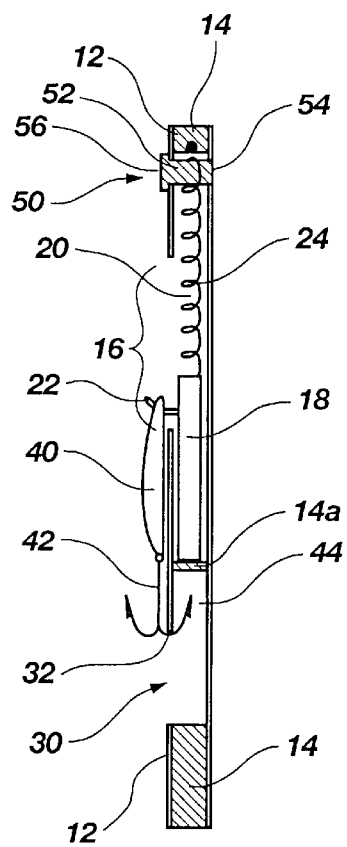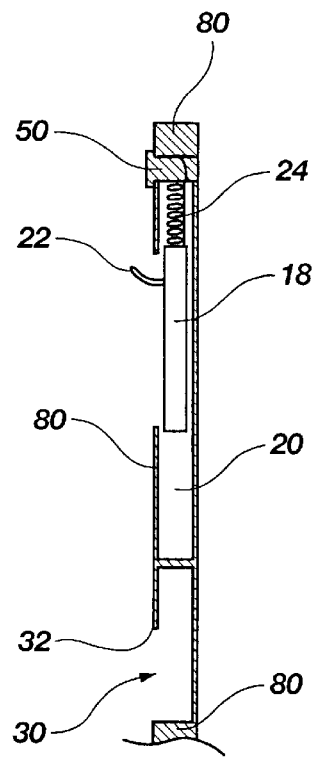
Fig. 3A          Fig. 3B          Fig. 3C
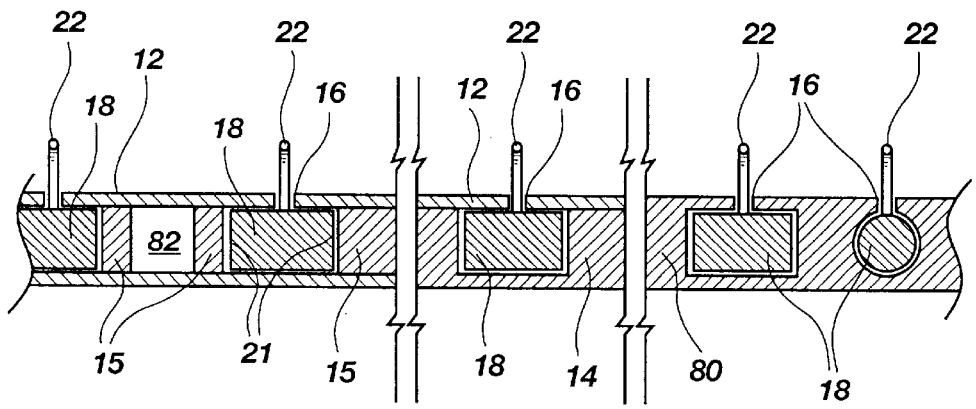
Fig. 4

FISHING LURE STORAGE SYSTEM

BACKGROUND OF THE INVENTION

1. Field of the Invention

This invention relates to storage systems for fishing tackle. More particularly, the present invention relates to an improved system for storing fishing lures which holds multiple fishing lures in a convenient, safe manner that both protects the lures and the user, and prevents lures from becoming tangled, rusted, or from catching on other objects and users.

2. State of the Art

Safe, convenient, and organized storage of fishing tackle can be a headache for fishermen. Hooks and lures tend constantly to become tangled and disorganized, and if not stored properly can be somewhat hazardous. Moreover, if stored loosely in tackle boxes, or singly in individual cases, they can become rusted due to water which is frequently present in those containers. It is also inconvenient to carry several lures on one's person while stream fishing or wading.

Many methods and devices have been developed for storing and organizing fishing tackle and related gear. The most common of these are tackle boxes containing several stackable trays which are divided into smaller compartments in which lures and other tackle can be kept. There is generally also a floor area below the trays where larger items are stored. Such boxes are convenient for fishing from boats, but do not lend themselves to fishing on foot because of their weight and awkwardness.

As an improvement over bulky tackle boxes, some devices for storing and organizing fishing tackle comprise wearable devices. For example, U.S. Pat. No. 4,892,241 to Mavrakis discloses a foldable tackle box for wearing on the front of a user, including a plurality of compartments for storing articles, and a shelf with cork or polystyrene foam for holding fish hooks. U.S. Pat. No. 5,454,185 to Love discloses a wrist-mounted lure storage device comprising a wrist band having a layer of pliant material such as neoprene for holding fish hooks which may be driven into it, and a flexible cover which attaches to the storage device with velcro. U.S. Pat. No. 4,970,821 to Young discloses a canvas sheet having a plurality of rows of flaps for containing a plurality of removable plastic envelopes for holding fishing lures. The envelopes are configured to be attached to the clothing of a user for easy access to their contents.

Some fishing lure storage devices are made in booklet form. For example, U.S. Pat. No. 5,555,671 to Voight et al. discloses a hinged, light-weight fly box formed of foam material. The interior of the box comprises a series of ridges and depressed grooves for holding flies, being configured to allow the fly hooks to be embedded in the foam material. U.S. Pat. No. 3,769,741 to Hessler et al. discloses a fishing lure container in booklet form comprising soft foam pads of rubber, urethane, or the like, disposed on the inside, into which fishing lure hooks may be stuck.

Still other fishing lure holders are configured to hook and hold a fish hook and an attached piece of fishing line stretched and hooked in some way. For example, U.S. Pat. No. 4,516,707 to Crapanzano discloses a portable fishing lure container comprising a lure tray in a hinged outer box which folds into a stand for supporting the tray in an inclined upright position for easy access to the fishing lures. The lures are disposed on the tray by hooking the hook end in a notch formed on one end of the tray, and stretching a leader attached to the non-hook end of the lure through a second notch at the other end of the tray. U.S. Pat. No. 4,631,856 to Born discloses a fishing lure holder comprising a tray having a depressed center portion and designed to hold a fish hook with an attached leader, lure, a length of rubber tubing, and a swivel. The swivel is disposed through one of the holes in the depressed portion of the tray, with the leader extending through the backside. The leader and attached components are then wrapped around corresponding channels on the ends of the tray so that the lure and rubber tubing are disposed in the depressed portion, and the hook is then hooked on the rubber end of the tray. U.S. Pat. No. 5,829,185 to Myers discloses a fishing lure holding device comprising a tray having a plurality of spring-loaded lure eye gripping mechanisms disposed along one edge, and a grid of apertures formed from the opposite edge toward the center of the tray. The eye of a lure is placed in an eye gripping mechanism, and the opposing hook end of the lure is disposed through one of the apertures directly opposite, so as to secure the lure to the tray. Finally, a device called a shelled hook holder, available from many commercial vendors, comprises an elongate tray with a plurality of spring loaded hooks at one end for hooking the looped end of a hook leader, and a plurality of opposing triangular apertures for holding the hook attached to the leader. These are just a few examples of known fishing lure containers.

Unfortunately, these prior art devices have numerous drawbacks. While several of the prior art references mentioned above disclose a fishing lure container in booklet or similar form for shielding lures from contact with the user or other objects, many of these prior art devices only accommodate single pronged hooks, not double or treble hooks. Many of these also prevent drying of the lure after use, creating a risk of corrosion of the lures. All but one of the listed prior art devices do not include or suggest spring biasing means for biasing the hook end of a lure against the non-hook end so as to hold the lure in place, and the one that does include springs uses exposed compression springs which have a tendency to bind. Moreover, many of these devices are not useful for holding fishing lures, but only hooks with leader lines attached, and provide no protection for exposed prongs of multiple prong hooks. Finally, the prior art does not include fishing lure holders which allow one hook of a double hooked lure to be biased against the other.

It would thus be desirable to have a fishing lure storage system having tension spring biasing means for biasing one end of a lure against the other end, so as to hold the lure in place. It would also be desirable to have such a system in booklet form that is small and closeable for easy storage and transport, protects the exposed prongs of multiprong hooks from damage, and protects the user from snagging the hooks on clothing or flesh, but does not prevent wet lures from drying out.

SUMMARY OF THE INVENTION

It is therefore an advantage of the present invention to provide a fishing lure container for the storage of lures without attached leader lines.

It is another advantage of the invention to provide a fishing lure container having a means for biasing the hook end of a lure against the non-hook end so as to hold the lure in place.

It is another advantage of this invention to provide a spring biased fishing lure container which is less susceptible to binding of the springs, and minimizes exposure of the spring biasing means to the outer environment.

It is another advantage of this invention to provide a fishing lure container in booklet form that may be closed to protect the lures from damage and to protect the user from snagging the hooks, and which can be carried in a shirt or jacket pocket.

It is another advantage of this invention to provide a convenient fishing lure container in closeable booklet form which allows wet lures to dry out.

It is yet another advantage of this invention to provide a fishing lure container which will accommodate multiple prong hooks, in addition to single prong hooks.

The above and other advantages are realized in a fishing lure container comprising a substantially planar body of material which will not be damaged by water, preferably formed into a closeable booklet form, having a plurality of elongate slides disposed in slide channels formed on the inner sides of the body. Each slide has near its top portion a blunt lure hook protruding toward the inside of the booklet, and a spring which biases the slide and hook toward the top portion of the booklet. Toward the bottom of the inside of the booklet are one or more transverse hook channels which extend generally perpendicular to the elongate channels, and provide a lip for hooking fish hooks. One end of a fishing lure, such as the lure end, is disposed over one of the blunt hooks, then pulled against the biasing force of the spring until the curve of the hook end may be hooked on the lip of the transverse hook channel, causing the barb of the hook to be protected within a cavity behind the lip of the hook channel, and causing the lure to be held in place by the tensile biasing force of the spring.

By virtue of its design, this fishing lure container advantageously allows storage of multiple fishing lures in a convenient, safe manner that both protects the lures and the user, and also prevents lures from becoming tangled, rusted, or from catching on other objects and users. Other advantages and features of the present invention will be apparent to those skilled in the art, based on the following description, taken in combination with the accompanying drawings.

BRIEF DESCRIPTION OF THE DRAWINGS

FIG. 3A shows a cross-sectional view of one embodiment of the body taken through one of the slides, showing the slide in the retracted position without a lure attached;

FIG. 3B shows a cross-sectional view of an alternative embodiment of the body taken through one of the slides, showing the slide in the extended position with a lure attached;

FIG. 3C shows a longitudinal cross-sectional view of an entirely injection molded embodiment of the invention taken through one of the slides;

FIG. 4 shows a transverse cross-sectional view of each of the embodiments of FIGS. 3A–3C taken through the slides.

DETAILED DESCRIPTION OF THE PREFERRED EMBODIMENT

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
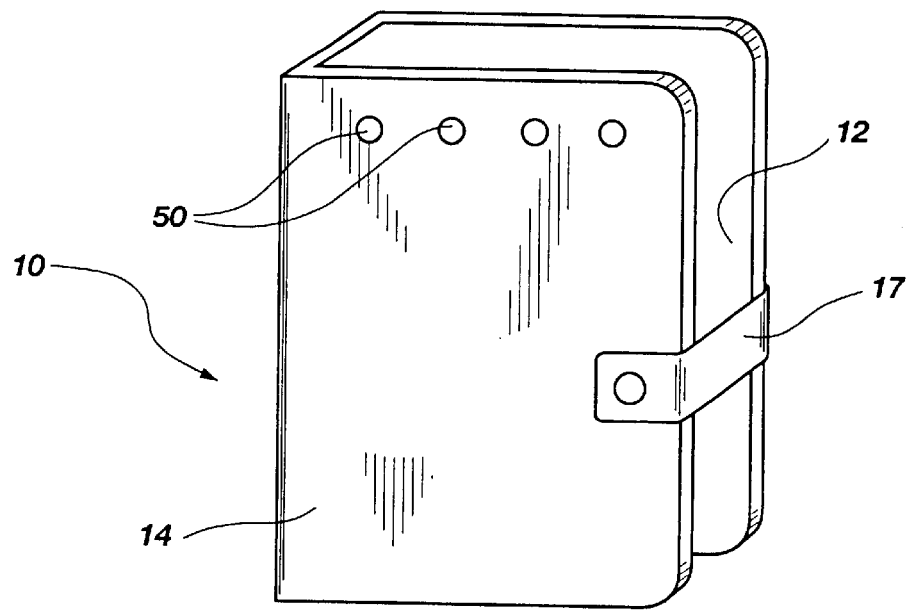
FIG. 1 shows an exterior view of the fishing lure container folded into a closed booklet form.

As shown in FIG. 1, the fishing lure storage system generally comprises a fishing lure container 10 folded in booklet form, being formed of a substantially planar body of material preferably comprising an inner ply of material 12, joined to a base 14. The inner ply 12 and base 14 preferably comprise polymer materials, and are joined together such as by adhesive, thermal welding, sonic welding, or any other suitable method of joining polymer materials together. The base 14 comprises a substantially solid pieced of plastic, having a plurality of internal channels, spaces, etc. formed therein, as described below. The configuration of the inner ply 12 and the base 14 is shown in longitudinal cross section in FIG. 3B, and in transverse cross section in the center portion of FIG. 4.

It will be apparent that the container 10 may be configured in other ways. For example, as shown in the cross sectional views of FIG. 3A and on the left side of FIG. 4, the body may comprise a thin inner ply 12, and a thin outer ply 13, joined together by a divider 15. The required channels, spaces, etc. described below are formed by the dividers between the inner and outer plies. As another alternative, shown in cross-sectional views in FIG. 3C and the right side of FIG. 4, the planar body may be formed as a single piece of material 80, such as injection molded plastic, having the internal channels, spaces, etc, formed therein. Other materials and configurations may also be used to form the substantially planar body, including corrugated hollow-core plastic, plastic extrusion, or other suitable material.

It will also be apparent that the slides 18 and channels 20 may have a variety of cross-sectional shapes. For example, the slides and channels may be rectangular or round, as shown on the right side of FIG. 4, or may have other shapes. The variety of shapes possible is not dependent upon which cross-sectional configuration of those shown in FIG. 4 is chosen for the sheet. So long as the shape of the channel generally matches the shape of the slide, and those shapes do not hamper the functioning of the device, any shape may be used.

The material of the body preferably will not be damaged by water, and may be flexible enough to be folded into a booklet or other compact, closed form for easy carrying and storage, and to protect the fishing lures and prevent them from catching on other objects and users. Alternatively, several relatively rigid bodies of material as described could be hingedly attached together, to allow the container to be easily opened and closed. Additionally, the container may be provided with a strap 17 having a button or snap as shown, or a zipper, ties, or other method of closure, and may also be configured for attaching to the clothing or other equipment of a fisherman.

Figure 2:
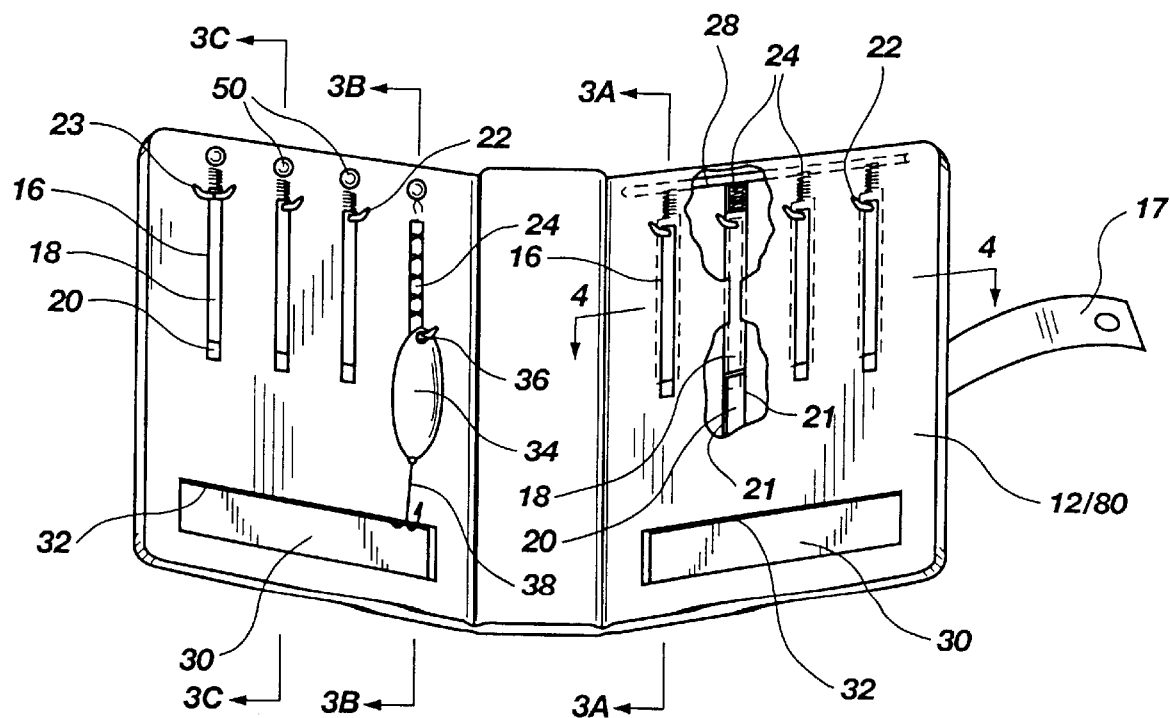
FIG. 2 provides a pictorial view of the fishing lure container in the open position.
Figure 6:
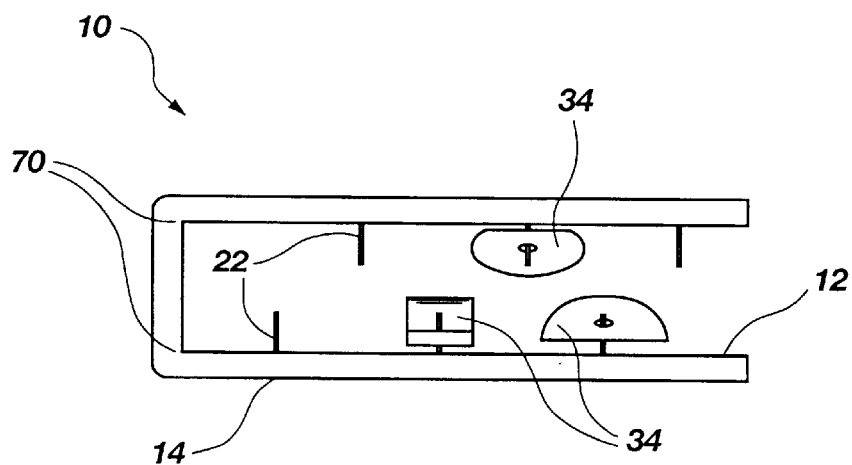
FIG. 6 shows a top edge view of an embodiment of the fishing lure storage system having offset lure hook locations.

In the following description, FIG. 2 will be described as comprising the embodiment formed of an inner ply 12 and base 14. However, it is to be understood that the description applies equally to the other embodiments described above. When the container 10 is opened as shown in FIG. 2, the means for holding the fishing lures is visible. The container generally comprises a plurality of elongate lure hook openings 16 formed in the inner ply 12 of the booklet 10, and a plurality of elongate slides 18 disposed in slide channels 20 formed in the base 14, behind the lure hook openings 16. It will be apparent that channels 20 are preferably approximately parallel in orientation, and may be placed very close together. Alternatively, channels 20 may be spaced some distance from each other, such as to accommodate large lures. Additionally, channels 20 on opposing sides of the booklet (right and left sides in FIG. 2) may be staggered in location so that lures on opposing booklet faces will not directly conflict with each other, but will nest between each other when the booklet is closed. A top edge view of the fishing lure storage system having offset lure hooks is shown in FIG. 6. Because the location of hooks 22 on opposing inner sides 12 of the container 10 are staggered relative to the hinge or folding locations 70, the bulky portion of each lure 34 tends to fall between hooks 22 disposed on the opposing side, making the closed container more compact.

As noted above, the invention may comprise inner and outer plies 12 and 13, joined by divider 15, shown in cross-section in FIG. 3A and FIG. 4, left side. Divider 15 may comprise a plurality of elements which are placed between the plies to form sides 21 of slide channels 20. In this embodiment, the sides 21 of channels 20 may comprise independent elements for each slide channel, leaving an open space 82 (FIG. 4) between channels 20, or a single divider piece 15 may form one side of one channel and also form the side of an adjacent channel.

The slides 18 (and the channels 20 also) are formed to be wider than the adjacent elongate lure hook opening 16, as shown in the partial cutaway on the right side of FIG. 2, and in the cross-sectional view of FIG. 4, so that the inner ply 12 holds the slides 18 in place. The length of the slides 18 is variable. However, the longer the slides, the more stable will be their operation—longer slides will be less likely to bind in channels 20.

Figure 5:
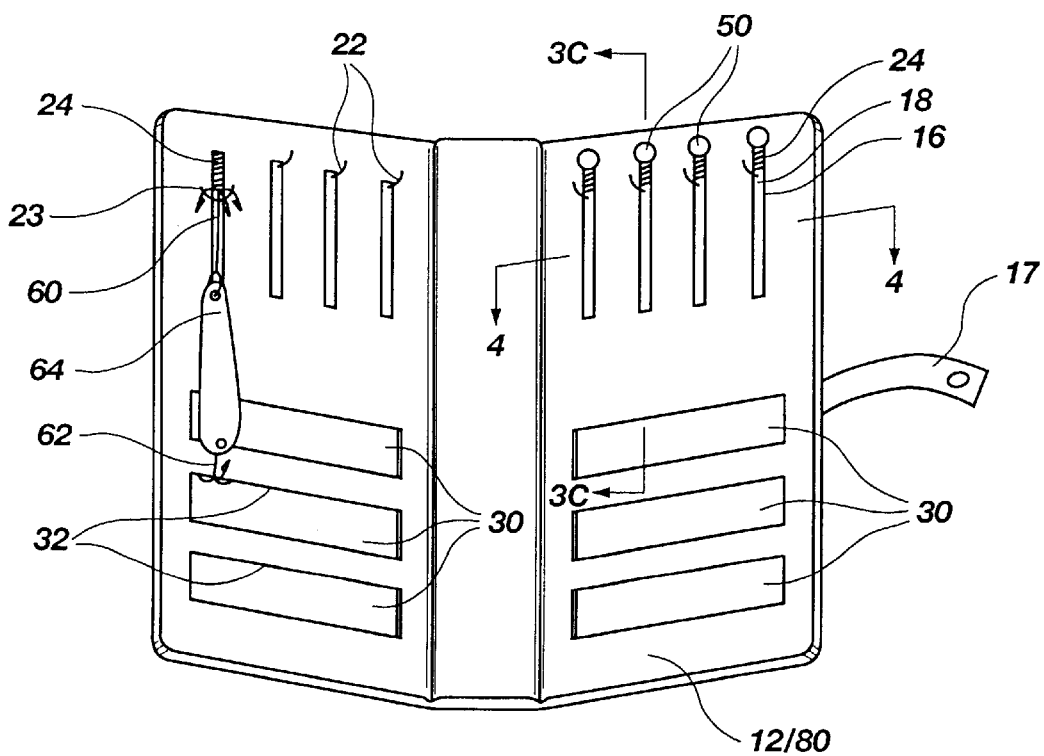
FIG. 5 shows a pictorial view of an alternative fishing lure container having multiple hook channels.

Each slide 18 has near its top portion a blunt lure hook 22 protruding through the corresponding lure hook opening 16 toward the inside of the booklet, and a coil spring 24 attached to the top extremity of the slide. Multiple prong lure hooks 23 may also be provided as shown in FIG. 2 and FIG. 5, and are useful for hooking multiple hook lures, such as Rapala® lures, which have more than one treble hook.

Spring 24 may be affixed within the top of the body by any suitable method. Visible in FIG. 1 on the outside of the container 10 are several buttons 50. In the preferred embodiment of the invention, buttons 50 are disposed in holes formed through inner ply 12 and base 14, and placed above and aligned with each lure hook opening 16 (as depicted in FIG. 2, left side), or at the top of each lure hook opening 16 (as depicted in FIG. 5, right side). The shaft 52 of each button 50 provides a post around which the top extremity of the spring 24 is affixed. A cross-sectional view of this method of anchoring the spring is shown in FIG. 3B. This configuration advantageously simplifies manufacturing and assembly of the device, and also allows springs of different lengths and/or strengths to be substituted by the user. Additionally, the provision of removable buttons also facilitates replacement of springs which break or become overstretched. Because the back side 54 of the button is exposed (on the outside of the container, as seen in FIG. 1), the user simply pushes the button out from the back to release the spring, then removes the spring and replaces it as needed. Then, when a new or different spring 24 is in place with a loop aligned with the button hole, the user places the button shaft 52 through the button hole and the aligned loop, and presses the face 56 of the button so as to press or snap the button into place within the hole. In addition to buttons, other similar removable means of affixing the top of the springs 24 may be used, such as snaps.

As an alternative method of affixing the top of the springs, a transverse rod 28 may be disposed within the top of the body, behind the inner ply 12. The top of each spring 24 is wrapped around transverse rod 28, thus anchoring the spring. A cross-sectional view of this method of anchoring the spring is shown in FIG. 3A. It will be apparent to one skilled in the art that other means of fastening the top portion of springs 28 may also be used, including spring anchoring means which are not removable. Any method of firmly anchoring the top of springs 24 behind inner ply 12 so as to allow the springs to resiliently bias the motion of slides 18 may be used.

Toward the bottom of the inside of the booklet, one or more transverse hook channels 30 are formed in base 14. Hook channels 30 are formed on the inside surface of ply 14, but do not extend entirely through the thickness thereof, so as not to extend through the outside of the body. It will be apparent that the number and spacing of hook channels 30 is variable, depending on the variety and size of hooks to be accommodated in the container 10. FIG. 5 shows a pictorial view of an embodiment of the invention having multiple hook channels 30. Ply 12 preferably comprises an overhang 32 which extends below the top of each hook channel 30, providing an edge for hooking the curved portion of a fish hook, and forming a cavity 44 for encasing and protecting the barb(s) of the hook, as shown in FIG. 3B. It will be apparent that the invention is useful for single, double, or treble hooks.

As shown in FIG. 2, the lure end 36 of a conventional fishing lure 34 is disposed over one of the blunt lure hooks 22, with its hook end 38 hooked on the top edge 32 of channel 30. Alternatively, as shown in FIG. 5, in the case of lures having multiple hooks 60 and 62 on opposing ends of a single lure body 64, one hook 60 may be hooked upon a single lure hook 22 or double lure hook 23, and the other hook 62 hooked on the top edge 32 of an appropriate hook channel 30 to firmly hold the lure in place.

The function of the slides and springs is more clearly evident from FIGS. 3A–3C, which provide cross sectional views of the body taken through one of the slides. In FIG. 3A hook 22 is not in use, such that slide 18 is fully retracted, with hook 22 disposed near or against the top of opening 16 by the force of spring 24. In FIG. 3B the hook is shown in use holding a relatively short lure 40 with its hook end 42 hooked on the top edge 32 of channel 30. In this view the spring 24 is visible in its fully extended or stretched position.

By using tension springs and slides as shown, the slides are less likely to bind in the channels than prior art devices, and the invention thus functions more smoothly than the prior art. Moreover, by placing the springs behind the inner ply, the springs are substantially protected from outward exposure, thus reducing damage to the springs and the likelihood of objects becoming caught in them when they compress, among other advantages.

As also shown in FIG. 3B, the base 14 may also comprise a stop 14a disposed at the bottom of each channel 20, to limit downward travel of slide 18. Likewise, as shown in FIG. 3A, the divider 15 may also comprise a stop 15a which serves the same purpose in an alternative embodiment. This stop would perform several functions, including preventing over-extension of spring 24, preventing the bottom extremity of slide 18 from interfering with a lure hook disposed within cavity 44, and strengthening the structure of the entire device. Likewise, the injection molded embodiment depicted in FIG. 3C and FIG. 4, right side, includes a comparable structure for limiting the downward movement of the slide 18.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A fishing lure storage system comprising:
   (a) a substantially planar body of material having a top and a bottom edge and an inner surface;
   (b) a slide channel having a top end, the slide channel being formed in one side of the body and extending from near the top edge toward the bottom edge thereof;
   (c) an elongate slide, slidably disposed within the slide channel, the slide having a length sufficient to substantially prevent binding within the slide channel;
   (d) a spring connected to the slide, configured for biasing the slide toward the top of the body;
   (e) a lure hook, protruding from the slide generally away from the inner surface of the body;
   (f) a hook channel, having a top edge, formed in the body near the bottom edge thereof and oriented perpendicular to the slide channel; and
   (g) whereby a fishing lure may be stored by disposing one end of the lure over the lure hook, and sliding the slide within the slide channel against the spring so as to attach a fish hook disposed on the other end of the lure adjacent the top edge of the hook channel.

2. The fishing lure storage system as described in claim 1, wherein the substantially planar body of material may be folded in booklet form to form a container for substantially shielding the hooks of stored lures from outward exposure.

3. The fishing lure container as described in claim 2, wherein the substantially planar body of material comprises a plurality of substantially planar bodies foldably attached to each other.

4. The fishing lure container as described in claim 2, further comprising closure means for fixing the booklet in its folded configuration.

5. The fishing lure storage system as described in claim 1, further comprising a plurality of generally parallel slide channels oriented perpendicular to the hook channel.

6. The fishing lure storage system as described in claim 5, further comprising a plurality of generally parallel hook channels oriented perpendicular to the plurality of slide channels.

7. The fishing lure storage system as described in claim 1, wherein the substantially planar body of material comprises an inner ply of material joined to a base, with the slide channel and hook channel formed in the base.

8. The fishing lure storage system as described in claim 7, wherein the inner ply and base are formed of injection molded plastic.

9. The fishing lure storage system as described in claim 1, wherein the substantially planar body of material comprises a substantially unitary piece of injection molded plastic, with the slide channel and hook channel formed therein.

10. The fishing lure storage system as described in claim 1, wherein the substantially planar body of material further comprises:
    (a) anchor means for fixedly anchoring an end of the spring behind the inner surface of the body between the top edge of the body and the top end of the slide channel;
    (b) wherein the slide comprises a slide bar having a top end and a bottom end, and configured for sliding within the slide channel; and
    (c) wherein the spring comprises a tension spring attached at a first end to the top end of the slide bar, and at a second end to the anchor means, and configured to normally bias the slide bar toward the top edge of the body.

11. The fishing lure storage system as described in claim 10, further comprising:
    (a) an elongate lure hook opening formed in the inner surface of the body and aligned with the slide channel and slide;
    (b) wherein the slide is wider than the lure hook opening in the inner surface so as to hold the slide within the slide channel; and
    (c) wherein the lure hook extends through the lure hook opening and is slidable therein.

12. The fishing lure storage system as described in claim 10, wherein the anchor means comprises an elongate bar of material oriented substantially perpendicular to the slide channel.

13. The fishing lure storage system as described in claim 10, wherein the anchor means comprises a removable button disposed near the top of the body and extending through the thickness thereof.

14. The fishing lure storage system as described in claim 1, wherein the lure hook comprises a multiple pronged hook.

15. A fishing lure storage system comprising:
    (a) a substantially planar body of material comprising an inner ply of material and a base joined together, having a top and a bottom edge;
    (b) a plurality of generally parallel elongate lure hook openings formed in the inner ply, each elongate opening having a top end and extending from near the top edge toward the bottom edge of the planar body;
    (c) a plurality of slide channels formed in the base and aligned with each of the elongate lure hook openings;
    (d) a slide bar slidably disposed within each of the plurality of slide channels, each slide bar comprising an elongate bar of material having a top end and a bottom end, and having a length sufficient to substantially prevent binding of the slide bar within the slide channel;
    (e) a lure hook fixedly connected to the top end of each slide bar, and protruding generally away from the plane of the inner ply, through the corresponding elongate opening, and configured to slide linearly therein;
    (f) tension spring anchor means fixedly disposed within the base, between the top edge of the body and the top end of the elongate openings;
    (g) a plurality of tension springs, each attached at a first end to the top end of a slide bar, and at a second end to the tension spring anchor means, and configured to resiliently bias the slide bar toward the top edge of the body;
    (h) at least one hook channel opening formed in the inner ply toward the bottom edge of the body, having a top edge, and oriented generally perpendicular to the plurality of lure hook openings;
    (i) at least one hook channel formed in the base toward the bottom edge thereof and generally aligned with the hook channel opening in the inner ply, the top edge of the hook channel being disposed above the top edge of the hook channel opening, forming a cavity behind the inner ply and above the top edge of the hook channel opening for receiving the barb of a fish hook; and
    (j) whereby a fishing lure may be stored in the fishing lure container by disposing one end of the lure over a lure hook, and sliding the corresponding slide against the tension spring, so as to attach a fish hook disposed on the other end of the lure on the top edge of the hook channel opening.

16. The fishing lure container as described in claim 15, wherein the substantially planar body of material may be folded in booklet form for substantially shielding hooks from outward exposure.

17. The fishing lure container as described in claim 15, wherein the lure hook comprises a multiple pronged hook.

18. The fishing lure container as described in claim 15, wherein the anchor means comprises a removable button disposed near the top of the body in alignment with the top of each lure hook opening and extending through the thickness of the inner ply and base.

19. A method of storing a fishing lure, comprising the steps of:
   a) obtaining a fishing lure having a lure end and a hook end, with at least one fish hook disposed at the hook end;
   b) disposing the lure end of the fishing lure over a lure hook slidably disposed in a channel in a first side of a substantially planar body having a top edge and a bottom edge and an inner side;
   c) pulling the lure hook toward the bottom edge of the body, against a biasing spring, so as to bring the at least one fish hook of the lure proximate a top edge of a hook channel formed near the bottom edge of the body; and
   d) hooking the at least one fish hook on the top edge of the hook channel.

20. The method as described in claim 19, further comprising the step of folding a portion of the substantially planar body over another portion thereof in booklet form, so as to cause portions of the inner side of the body to face each other, so as to cover the at least one lure.

21. The method as described in claim 19, further comprising the step of releasably fastening the substantially planar body in the folded configuration.

* * * * *